(12) United States Patent
Beer

(10) Patent No.: US 9,120,617 B2
(45) Date of Patent: *Sep. 1, 2015

(54) SINGLE BREW BEVERAGE CARTRIDGE SYSTEM INCLUDING SAME AND METHOD OF USE

(71) Applicant: Fres-co System USA, Inc., Telford, PA (US)

(72) Inventor: Jeffrey Scott Beer, Coopersburg, PA (US)

(73) Assignee: Fres-co System USA, Inc., Telford, PA (US)

( * ) Notice: Subject to any disclaimer, the term of this patent is extended or adjusted under 35 U.S.C. 154(b) by 428 days.

This patent is subject to a terminal disclaimer.

(21) Appl. No.: 13/650,558

(22) Filed: Oct. 12, 2012

(65) Prior Publication Data

US 2013/0095212 A1  Apr. 18, 2013

Related U.S. Application Data

(60) Provisional application No. 61/547,968, filed on Oct. 17, 2011.

(51) Int. Cl.
*B65D 85/804* (2006.01)

(52) U.S. Cl.
CPC ............ *B65D 85/8043* (2013.01); *Y02W 90/13* (2015.05); *Y02W 90/14* (2015.05)

(58) Field of Classification Search
CPC .................... B65D 85/8043; A47J 31/0673
See application file for complete search history.

(56) References Cited

U.S. PATENT DOCUMENTS

| | | | |
|---|---|---|---|
| 5,325,765 A | 7/1994 | Sylvan et al. | |
| 5,840,189 A | 11/1998 | Sylvan et al. | |
| 2004/0045443 A1* | 3/2004 | Lazaris et al. | 99/279 |
| 2005/0287251 A1 | 12/2005 | Lazaris et al. | |
| 2011/0073607 A1* | 3/2011 | Fu et al. | 220/711 |

* cited by examiner

*Primary Examiner* — Rena L Dye
*Assistant Examiner* — Chaim Smith
(74) *Attorney, Agent, or Firm* — Caesar Rivise, PC

(57) ABSTRACT

Disclosed is a single brew beverage cartridge for use in a brewing apparatus. The cartridge includes a lid and a cup shaped filter suspended below the lid and in which a beverage brewing ingredient is held. The lid includes an annular collar to prevent the lid from deforming when a needle of the brewing apparatus pierces it during the brewing process. Preferably the cartridge is formed of materials, e.g., paper/paperboard, so that it is compostable and biodegradable.

22 Claims, 3 Drawing Sheets

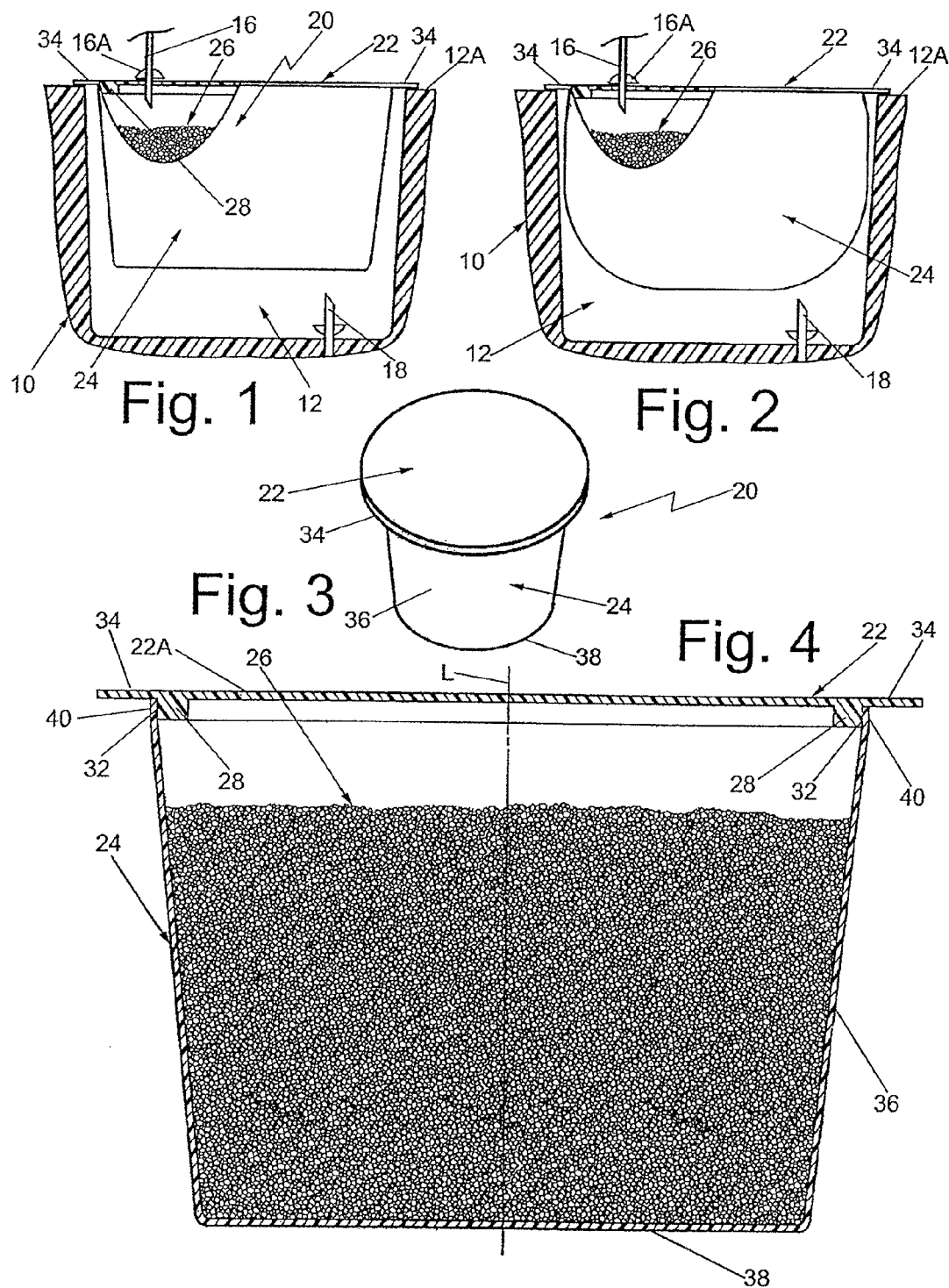

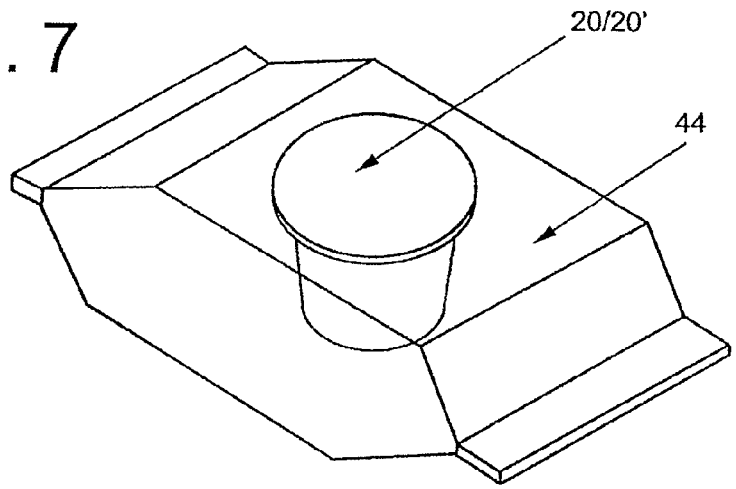
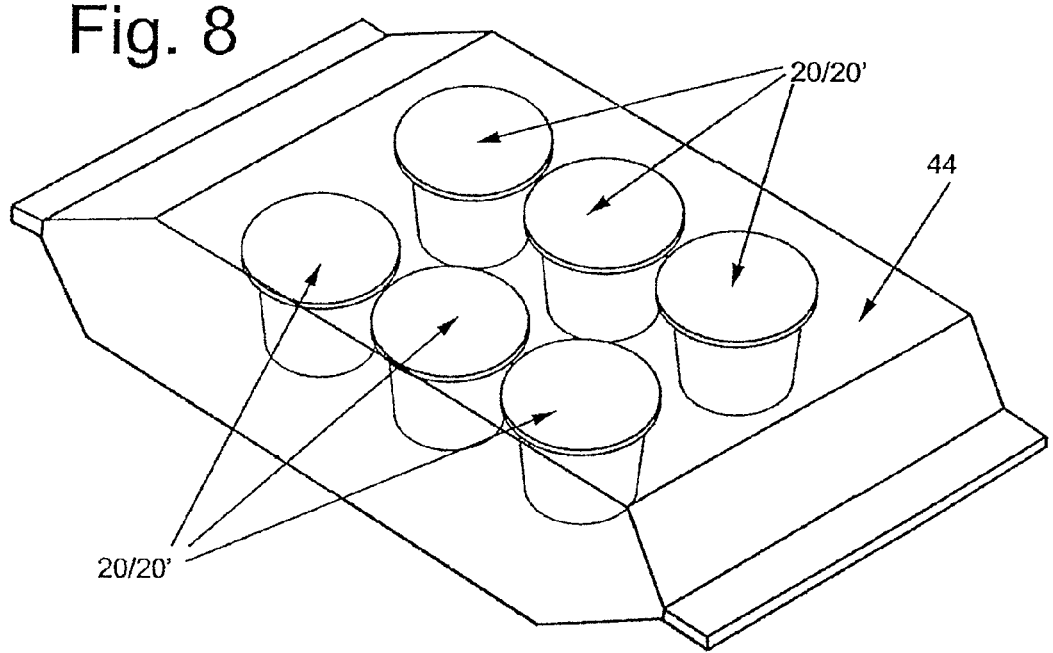

SINGLE BREW BEVERAGE CARTRIDGE SYSTEM INCLUDING SAME AND METHOD OF USE

CROSS-REFERENCE TO CROSS-REFERENCE TO RELATED APPLICATIONS

This application claims priority from Provisional Application Ser. No. 61/547,968, filed on Oct. 17, 2011, entitled Single Brew Beverage Cartridge System Including Same and Method of Use, which application is assigned to the same assignee as this application and whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to beverage brewing and more particularly to single brew cartridges for brewing beverages in single serve apparatus and methods of brewing such beverages.

BACKGROUND OF THE INVENTION

The patent literature includes various examples of single brew beverage filter packages or cartridges for use in brewing apparatus. For example, U.S. Pat. No. 5,325,765 discloses a beverage filter cartridge that includes an impermeable pierceable base having a predetermined shape and an opening at one end. The base is formed of polystyrene, ethylene vinyl alcohol and polyethylene. A self-supporting wettable filter element is disposed in the base. The filter element may be made of a lightweight, two-phase heat sealable paper of cellulosic and synthetic fibers. The synthetic fibers may be PVC or polypropylene so that they are compatible with the material of the base and are therefore easily sealed to the base in communication with the opening in the base using heat, ultrasonic energy or microwave energy. The filter element has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract. An impermeable pierceable cover is provided sealingly engaged with the opening in the base to form an impermeable cartridge. U.S. Pat. No. 5,840,189 discloses a somewhat similar beverage filter cartridge.

While the cartridges of those patents are suitable for their purposes they are nevertheless somewhat complex in construction, e.g., they require a self supporting, e.g., plastic material, outer base in which the filter element is suspended to break up the interior of the base into the two chambers.

In Published U.S. Application 2005/0287251 there is disclosed a disposable beverage filter package that does not make use of an outer base. In particular, the filter package comprises a flexible and permeable filter pouch in the form of a cone having a sidewall extending downwardly from a top opening to a closed bottom. The pouch is suspended from and supported exclusively by an imperforate impermeable lid configured and arranged to close the top opening and to coact with the pouch in defining an enclosed chamber. The side wall of the pouch has an upper region with a permeability that is greater than that of a lower region. This difference in permeability may be provided by various means, e.g., by adding an inner cone shaped insert of the same material as that of the outer wall. A dry beverage medium is loosely contained within the filter pouch. The lid is piercable to admit a flow of heated liquid under pressure into the chamber, with the permeability of the pouch being such that the admitted liquid is retained temporarily in the chamber for infusion with the beverage medium before permeating through and flowing downwardly along the exterior of the sidewall as a liquid beverage.

While the cartridge of that application appears generally suitable for its purposes, it is still somewhat complex in construction (e.g., makes use of a conical filter whose lower end, in which the beverage brewing ingredient will be concentrated, is of thickened or double wall thickness), is somewhat limited in the amount of beverage brewing ingredient it can hold, and may leave something to be desired from the standpoint of effectiveness in brewing the beverage.

Thus, there presently exists a need for a disposable beverage filter cartridge for use in beverage brewers, with the cartridge being low in cost, simple in construction and preferably compostable and biodegradable so that it can be readily and safely disposed of after use. The subject invention addresses that need.

SUMMARY OF THE INVENTION

In accordance with one aspect of the invention there is provided a single brew beverage cartridge for use in a beverage brewing apparatus, the apparatus comprising a brewing chamber, a supply of a hot liquid, and a piercing member. The cartridge is compostable and biodegradable and comprises a filter, a beverage-brewing ingredient, and a lid. The lid comprises a piercable portion, a flange and a collar, with the collar comprising a side wall having a peripheral surface projecting downward from the flange and extending about a longitudinal axis. The lid is resistant to flexure when a force is applied to the piercable portion of the lid in a direction parallel to the longitudinal axis. The filter comprises an expandable, cup-shaped hollow body formed of a layer of material having a first portion secured to periphery of the collar and a second portion extending substantially below the collar. The cup-shaped body holds the beverage brewing ingredient, with the lid sealing the beverage brewing ingredient in the cup-shaped body. The cartridge is arranged to be suspended by its flange in the brewing chamber of the apparatus. The piercing member of the brewing apparatus is arranged to apply a force in the longitudinal direction to the piercable portion of the lid of the cartridge to pierce the lid when the cartridge is suspended within the brewing chamber. The collar of the lid of the cartridge is resistant to flexure by the application of that force to facilitate the piercing of the lid by the piercing member.

In accordance with one aspect of this invention the lid is formed of paper/paperboard including a biodegradable coating of polyethylene. The cup-shaped body of the filter comprises a layer of paper comprising a multitude of paper fibers.

In accordance with another aspect of this invention there is provided a system made up of a single brew cartridge as set forth above in combination with a single serve beverage brewing apparatus.

In accordance with another aspect of this invention provided a method of brewing a beverage using apparatus like that set forth above. That method basically entails suspending the single brew cartridge by its collar in the brewing chamber of the apparatus. Thereafter, the piercing member of the brewing apparatus is caused to apply a force in the longitudinal direction to the piercable portion of the lid when the cartridge is suspended within the brewing chamber to pierce through the lid. The collar of the lid resists flexure of the lid from the application of that force to facilitate the piercing of the lid by the piercing member. Hot liquid is then introduced through the piercing member into the cartridge to brew the beverage therein, whereupon the beverage can flow out of the cartridge through the second portion of the filter.

DESCRIPTION OF THE DRAWING

FIG. 1 is side elevation view partially in section of a single serve beverage brewing apparatus making use of a single brew beverage cartridge constructed in accordance with this invention, with the apparatus being shown at an initial point in the process of brewing a beverage;

FIG. 2 is a side elevation view, like that of FIG. 1, but showing the apparatus at a later point in the process of brewing a beverage;

FIG. 3 is a reduced isometric view of the cartridge shown in FIGS. 1 and 2;

FIG. 4 is an enlarged vertical sectional view of the cartridge shown in FIGS. 1 and 2;

FIG. 7 is an isometric view of one exemplary bag or container for holding a cartridge of this invention until the cartridge is ready for use; and FIG. 8 is an isometric view of another exemplary bag or container, holding a plurality of cartridges of this invention.

DETAILED DESCRIPTION OF THE PREFERRED EMBODIMENT

Figure 5:
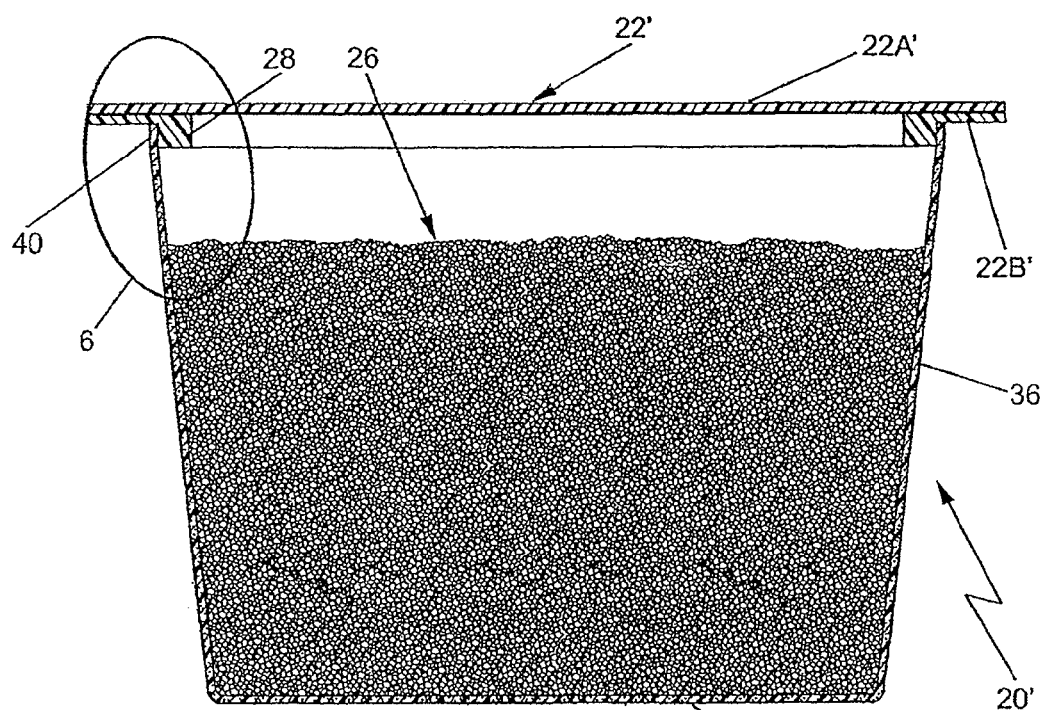
FIG. 5 is a vertical sectional view, similar to FIG. 5, but showing an alternative embodiment of a single brew beverage cartridge constructed in accordance with this invention.

Referring now to the various figures of the drawing wherein like reference characters refer to like parts, there is shown in FIG. 1 one exemplary embodiment of a single serve beverage brewing cartridge 20 constructed in accordance with one aspect of this invention. The cartridge 20 (as well as other cartridges constructed in accordance with this invention) holds a beverage brewing ingredient, e.g., ground roasted coffee, tea, etc.), and is arranged to be used in various types of beverage brewing apparatus. In particular, as will be described in detail later, the cartridge 20 is arranged to be pierced in the apparatus to introduce hot water into it to brew the desired beverage. However, unlike those prior cartridges having a plastic base in which a filter is disposed to create a first chamber for holding the beverage brewing ingredient and a second chamber into which the brewed beverage passes (e.g., the cartridges of U.S. Pat. Nos. 5,325,765 and 5,840,189 and other similar cartridges), the cartridges of this invention do not have to be pierced a second time to enable the brewed beverage to flow out of them. Instead, as will be seen the brewed beverage automatically flows directly out of the cartridge once the hot liquid is introduced therein without the need for any piercing mechanism to effect that action.

Thus, the cartridges of this invention can be used in any type of brewing apparatus that has a chamber for receiving the cartridge and a needle or some other piercing means for introducing hot pressurized water into the cartridge. In fact, the cartridges of the subject invention can be used in prior art brewing apparatus like those Keurig brewing machines used for cartridges like disclosed in the aforementioned U.S. Pat. Nos. 5,325,765 and 5,840,189. One example of such prior art brewing machines is shown schematically at 10 in FIG. 1. That prior art brewing machine includes a needle to pierce the bottom of the cartridge to receive the brewed beverage when used with prior art single brew cartridges. However, that needle is not used to pierce the cartridges of this invention. In particular, when a cartridge constructed in accordance with this invention is used in such a prior art brewing apparatus, the cartridge is supported in the brewing chamber in a manner that precludes it from being pierced by the needle at the bottom of the brewing chamber. Instead, the brewed beverage automatically flows out of the cartridge into the bottom of the brewing chamber from whence it is carried by the needle to some means (not shown) for dispensing it into some vessel (e.g., a cup, mug, etc.).

Turning now to FIG. 1, it can be seen that the exemplary brewing apparatus 10 basically comprises a housing having a hollow beverage brewing chamber 12 for receipt of the cartridge 20. A cover (not shown) of the housing is pivotably connected to the chamber 12 to close the chamber off and seal it when the cartridge 20 is located in it. The cover carries a hollow needle 16 which is arranged to penetrate a top portion of the cartridge when the cover is pivoted closed. The needle 16 serves to introduce pressurized hot water into the beverage brewing ingredient in the cartridge. A gasket 16A extends about the periphery of the needle 16 to form a seal with the portion of the cartridge contiguous with the hole formed by the needle to prevent the hot water from exiting that interface. The hot water injected into the cartridge is thus infused with the beverage brewing ingredient therein. The resulting brewed beverage automatically flows directly out of the cartridge into the brewing chamber without the need for any other means as will be described in detail later. Since the apparatus 10 is arranged to be used with prior art cartridges, it does include a second hollow needle 18 which extends into the chamber 12 from its bottom. The needle 18 is coupled to a dispenser (not shown) and is arranged to carry the brewed beverage out of the brewing chamber 12 into the receiving vessel, but does not penetrate the cartridge of this invention to achieve that end.

Turning now to FIGS. 3 and 4, the details of one exemplary cartridge 20 will now be described. As can be seen the cartridge basically comprises a disk-like lid 22 and a cup-shaped filter 24 and a beverage-brewing ingredient 26, e.g., roast ground coffee, located within the hollow interior of the cup-shaped filter 24. Preferably the components making up the lid and filter are formed of material(s) that lend themselves to safe disposal (e.g., are compostable and/or biodegradable) after the cartridge has been used to brew the beverage. To that end, the lid 22 is formed of some impermeable yet pierceable material, e.g., a polymer, such as polylactic acid or polylactide. The lid is of circular profile, e.g., 21 mm, when viewed from the top and includes an annular collar 28 projecting downward, e.g., 2 mm from its undersurface 30 about a longitudinal axis L (FIG. 4). The outer surface 32 (FIG. 4) of the collar 28 is located radially inward a slight distance, e.g., 2 mm, from the outer periphery of the lid to result in a flange 34 extending about the periphery of the lid and about axis L.

The cup-shaped filter 24 is formed of any suitable permeable/perforate material and is arranged to be expandable (for reasons to be described later). The expandability of the cup shaped filter may be provided by fluting or otherwise contouring, e.g., dimpling, etc., the material making up the filter so that the volume encompassed by the filter expands when the hot liquid is introduced into the beverage brewing ingredient held within the filter. Alternatively, the material making up the filter may be chosen so that it inherently expands during the brewing process.

In the exemplary embodiment shown in FIG. 4 the filter is formed of polylactic acid, in the interest of compostability and/or biodegradability. Other materials, e.g., paper or other polymers or combinations thereof, can be used for the filter, if desired. The filter 24 is of somewhat cylindrical shape with a slightly downwardly tapering sidewall 36 extending about axis L and a generally planar bottom wall 38 extending perpendicularly to that axis. The height of the sidewall is approximately 13 mm, while the diameter of the bottom wall is approximately 14 mm to enable a charge of 12 grams of coffee to be held within it. It should be appreciated, that other cup-shaped configurations can be used in lieu of the one shown herein so long as it includes some hollow interior in which a suitable charge of the beverage brewing ingredient 26 can be held. The top peripheral edge 40 (FIG. 4) of the sidewall 36 of the filter 24 is fixedly secured to the outer surface 32 of the annular collar 28, e.g., it is welded thereto, so that the filter with its charge of beverage brewing ingredient 26 is suspended downward from the cartridge's lid 22.

It should be pointed out at this juncture that the materials making up the components of the cartridge 20 as described above are exemplary of various materials that can be used in accordance with this invention. For example, the cartridge can be formed primarily of paper or paperboard in the interest of compostability, biodegradability and cost. Such a cartridge may be constructed similarly to that shown in FIGS. 3 and 4 using the following materials. The piercable lid 22 is in the form of a planar disk, which is of circular shape, e.g., 2 inches in diameter and 0.013 inches, thick and comprises liquid packaging board (e.g., a multi-ply paperboard made from only virgin paper fibers, with high stiffness and strong wet sizing) that is coated on both sides with biodegradable polyethylene. The total thickness of the packaging board is approximately 0.012 inches and is composed of three plies. The middle (or bulk) ply is made from unbleached chemical pulp and waste recycled from the paper machine. The two outer plies are made of bleached chemical pulp. Both sides of the liquid packaging board are extrusion coated with 0.0005 inch thick layers of low-density polyethylene and an additive to render the polyethylene biodegradable. In the exemplary embodiment the additive is 1% by weight of ethylene vinyl acetate copolymer with additive ingredients of organoleptic-organic chemical names/cultured colloids, natural fiber and is available from ECM Biofilms Inc. of Painesville, Ohio under the designation ECM6.0701 MasterBatch Pellets™.

In this embodiment, the annular collar 28 is a separate component from the planar disk 22, but is secured to it to form a unitary member. To that end, the collar 28 is formed from a spiral wound paperboard tube that is 1⅞ inch in outside diameter, with a wall thickness of 0.07 inches and is cut to a length of 0.3 inches. The cut tube is coated with ethylene vinyl acetate copolymer to render it weldable. The ethylene vinyl acetate copolymer coating weight is 2-3 pounds per 3000 square feet. The cut tube forming the collar is welded to underside of the disk 22, with the edge of the collar (tube) centered on the flat side of the disk, so that a 1/16 inch lip of the disk extends all around the collar. That lip forms the flange 34 of the cartridge to support the cartridge in the brewing apparatus.

The filter component 24 of this embodiment of the cartridge comprises heat sealable filter paper sheet that is made up of a filtration layer formed from coarse long fiber pulp (e.g., abaca fibers, wood pulp, and cellulose rayon fiber) and a sealing layer (e.g., polyethylene and ethylene vinyl acetate copolymer). The filter paper sheet has a basis weight of 41 grams per square meter. In order to form the cup-shaped filter a flat sheet of the filter paper is pressed into a heated female die with a heated male die. The combination of heat and pressure from the dies forms the filter paper sheet into the shape of a cup, with a mouth having a diameter just slightly larger than 1⅞ inches and a depth of 1½ inches and a bottom diameter of 1½ inches.

The filter paper cup is filled with the desired quantity of beverage powder, for example 12 grams of ground coffee. The mouth (peripheral edge) of the filter cup is slipped over the collar 28 and the abutting portions of the mouth of the filter cup and the outer surface of the collar are heat sealed together, thereby completing the assembly of the cartridge.

Any cartridge constructed in accordance with this invention can be used with a conventional single serve brewing apparatus 10 to brew a single serving of the beverage from the beverage making ingredient held in the cartridge. That action will now be described by reference to FIGS. 1 and 2. To that end the cartridge is disposed in the brewing chamber 12 of the apparatus 10 by disposing the peripheral flange 34 of the cartridge on an annular wall 12A surrounding the brewing chamber 12. When so disposed the bottom wall 38 of the cartridge is disposed above the free end of the needle 18 so that it will not be pierced by that needle. Moreover, and quite importantly, the cup shaped filter is unconstrained by the walls of the beverage brewing chamber (or by any other structure for that matter). Thus, the cup shaped filter 24 is enabled to expand during the brewing process (as will be described later). The cover (not shown) of the brewing apparatus is then closed to bring the top piercing needle 16 into engagement with a top portion 22A (FIG. 4) of the lid disposed inward from the collar 28. Continued downward pivoting of the cover causes the needle to pierce through the top portion 22A of the cover. The collar 28 provides sufficient rigidity to the structure to ensure that the downward force caused by the engagement of the needle on the lid as it pierces the lid does not distort the cartridge to prevent proper action. Once the needle has pierced through the lid portion 22A and is in position like shown in FIG. 1, hot water under pressure is injected through the needle into the interior of the cup-shaped filter 24. The gasket 16A prevents that hot water from exiting the interface between the needle and the pierced lid of the cartridge. The hot water injected into the cartridge is thus infused with the beverage brewing ingredient, e.g., the roast ground coffee therein, and the resulting beverage automatically flows out of the sidewall 36 and bottom wall 38 of the filter 24 into the brewing chamber 12. The brewed liquid then flows into the needle 18, from whence it is carried for dispensing into the cup, mug or other vessel provided for receipt thereof.

As should be appreciated by those skilled in the art, since the cup shaped filter is unconstrained within the chamber, when the hot water is introduced into the beverage brewing ingredient, the filter expands somewhat, e.g., its fluting opens so that the sidewall bulges out slightly as shown in FIG. 2. This expanding action of the filter has a beneficial effect of enabling better mixing of the water with the beverage brewing ingredient to enhance the infusion process, thereby resulting in a better brewed beverage. Thus, with the subject invention, less of the beverage brewing ingredient can be used for a given desired strength of brewed beverage or a higher strength brewed beverage can result from a given amount of beverage brewing ingredient.

Figure 6:
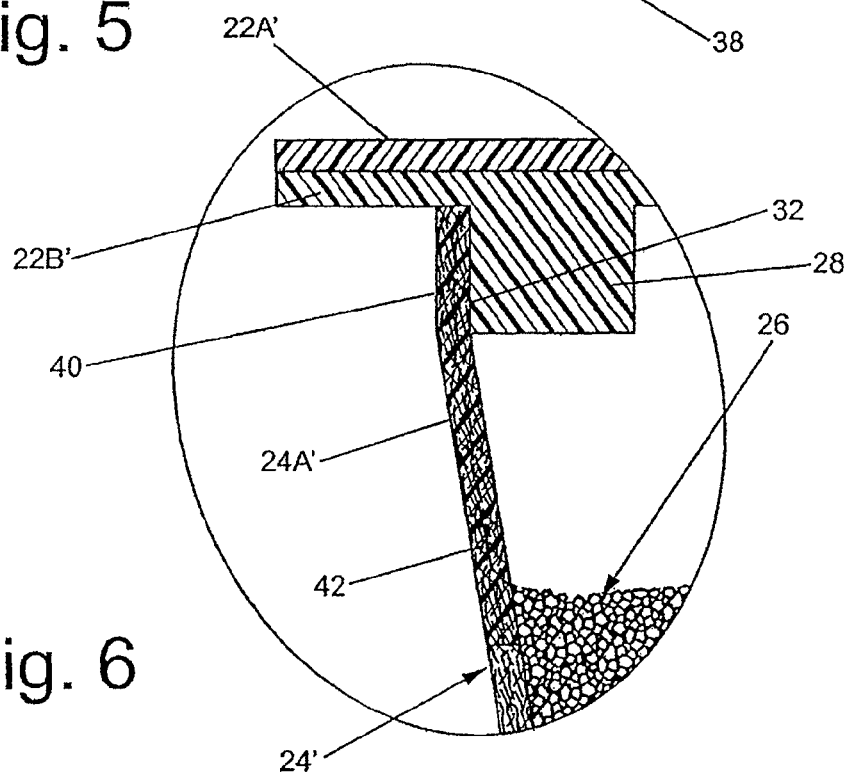
FIG. 6 is an enlarged view of the portion of the cartridge bounded by the oval area designated as 6 in FIG. 5.

Turning now to FIGS. 5 and 6 yet another exemplary embodiment of a single brew beverage cartridge constructed in accordance with this inventions is shown. That cartridge can be used in any brewing machine any cartridge 20 described above can be used in and is designated by the reference number 20'. The cartridge 20' is similar in many respects to the previously described cartridges 20. In the interest of brevity those components of the cartridge 20' that are common with like components of the cartridges 20 will be given the same reference numbers and the details of their construction and operation will not be reiterated. To that end, as can be seen in FIGS. 5 and 6 the lid 22' of the cartridge 20' comprises two members, namely, a planar disk-like member 22A' and a ring-like member 22B'. The ring-like member 22B' includes a collar 28 projecting downward from its undersurface. The ring like member 22B' also includes a flanged portion 34' extending radially outward from the outer surface 32 of the collar. The disk-like member 22A' is of circular profile and is of the same diameter as that of the ring-like member 22B' and is secured to the flanged portion 34' of the ring-like member 22B' by any suitable means, e.g., welding, an adhesive, etc. Each of the members 22A' and 22B' can be formed of any suitable material, e.g., a polymer, such as polyethylene, polylactic acid, or some other material, such as paper or paperboard (like that described above with respect to the primarily paper/paperboard embodiment 20).

The cartridge 20' includes a cup-shaped filter 24' that is of similar shape as filter 24. The filter 24' is formed of a permeable/perforate paper. In order to ensure that the top edge of the paper cup shaped filter is permanently fixedly secured to the outer surface 32 of the collar and remains so affixed during the brewing process, e.g., to prevent a blow out of the cartridge during the brewing process, a ring 42 of a polymer material, e.g., polyethylene or polylactic acid, is provided on the filter 24' contiguous with its upper edge. The strip may be approximately 10 mm wide by 130 mm long, and may be 38 microns thick. This strip acts as reinforcement for the paper making up the filter. In particular, the polymer film is first sealed to the paper and becomes embedded in the paper fibers as shown in FIG. 6. The exposed polymer surface of the now reinforced paper filter can then be sealed, e.g., welded, to the collar 28 of the lid.

As will be appreciated by those skilled in the art, when brewing a beverage using any cartridge constructed in accordance with this invention in any conventional brewing apparatus like described above, the coffee may splash in the brewing chamber leaving a residue on the walls of the chamber. That residue can be the source of an objectionable taste contamination if the next beverage brewed is not the same beverage as the previous one. For example, if the apparatus is used to brew a cup of coffee and then is to be used to brew a cup of tea, any residue of the brewed coffee left in the chamber may objectionably affect the taste of the brewed tea. To minimize that contamination potential one can minimize splashing by making the ring 42 extend downward a substantially greater distance of the height of the sidewall 36. Thus, the strip 42 of polymer may be made at least 30 mm high so that the area 24A' extends like a skirt substantially below the lid to help to direct the beverage flow downward. At the same time the ring of polymer still acts as reinforcement for the paper.

Inasmuch as the cartridges of this invention have substantially exposed areas into which moisture and air can gain ingress to potentially degrade the beverage brewing ingredient until the cartridge is ready for use, this invention contemplates the use of a moisture and air impermeable cover, e.g., a polymer or foil or laminate combination, to act as a barrier to the passage of air therethrough into the cartridge. Depending upon the construction of the cartridge the cover may be in the form of a barrier for use on the lid portion of the cartridge or on the filter portion or on both portions. Thus, the cover may be constructed to isolate all portions of the cartridge from the ambient air until the cartridge is ready for use. For example the cover may be in the form of a pouch or bag 44 as shown in FIG. 7 in which the cartridge is disposed. In FIG. 8 there is shown a plurality of cartridges 20/20' held within a single bag 44.

Irrespective of which portion(s) of the cartridge the cover is constructed to overlie to prevent the ingress of air therethrough, the cover should be removable so that the cartridge's filter is exposed (free to enable the brewed beverage to pass through its wall) when the cartridge is ready to be used in the brewing apparatus.

Without further elaboration the foregoing will so fully illustrate my invention that others may, by applying current or future knowledge, adopt the same for use under various conditions of service.

I claim:

1. A single brew beverage cartridge for use in a beverage brewing apparatus, the apparatus comprising a brewing chamber, a supply of a hot liquid, and a piercing member, said cartridge being compostable and biodegradable and comprising a filter, a beverage brewing ingredient, and a lid, said lid comprising a piercable portion, a flange and a collar, said collar comprising a sidewall having a peripheral surface projecting downward from said flange and extending about a longitudinal axis, said lid being resistant to flexure when a force is applied to said piercable portion of said lid in a direction parallel to said longitudinal axis, said filter comprising a cup-shaped hollow body holding said beverage brewing ingredient therein, said lid sealing said beverage brewing ingredient in said cup-shaped hollow body, said cup-shaped hollow body being formed of a single layer of paper or paperboard having a slightly tapering cylindrical sidewall and a generally planar bottom wall, said cylindrical sidewall having first and second cylindrical sidewall portions, said first cylindrical sidewall portion being located above said second cylindrical sidewall portion, said second cylindrical sidewall portion having a lower end terminating at said generally planar bottom wall, said second cylindrical sidewall portion and said generally planar bottom wall providing a substantially large surface area through which a brewed beverage can pass, said first cylindrical sidewall portion comprising a polymer welding said first cylindrical sidewall portion to said peripheral surface, said cartridge being configured to be suspended by said flange in the brewing chamber of the apparatus, the piercing member of the apparatus being arranged to apply a force in said longitudinal direction to said piercable portion of said lid to pierce said lid when said cartridge is suspended within the brewing chamber to introduce a hot liquid into said cup-shaped body, said polymer of said first cylindrical sidewall portion forming a barrier deterring the passage of the hot liquid through said first cylindrical sidewall portion and directing the flow of the hot liquid to said second cylindrical sidewall portion to cause said second cylindrical sidewall portion to expand radially outward unconstrained by the brewing chamber to facilitate the mixing of the hot liquid and said beverage brewing ingredient within said cartridge and permit said brewed beverage to exit therefrom.

2. The single brew beverage cartridge of claim 1 wherein said filter comprises heat sealable filter paper having a filtration layer formed of coarse long fiber pulp and a sealing layer form of a polymer.

3. The single brew beverage cartridge of claim 2 wherein said lid comprises primarily paper.

4. The single brew beverage cartridge of claim 3 wherein said primarily paper lid comprises a thin coating of polyethylene.

5. The single brew beverage cartridge of claim 4 wherein said thin coating of polyethylene is rendered biodegradable through the use of an additive.

6. The single brew beverage cartridge of claim 3 wherein said single layer of paper or paperboard comprising a multitude of paper fibers.

7. The single brew beverage cartridge of claim 6 comprising a cover disposed over said lid and said filter to prevent the ingress of air and moisture into said beverage brewing ingredient.

8. The single brew beverage cartridge of claim 7 wherein said cover is removable prior to the suspension of said cartridge in the brewing chamber of the apparatus.

9. The single brew beverage cartridge of claim 8 wherein said cover comprises a bag.

10. The single brew beverage cartridge of claim 9 wherein plural of said cartridges are disposed is said bag.

11. The single brew beverage cartridge of claim 1 wherein said single layer of paper or paperboard comprising a multitude of paper fibers.

12. In combination a single brew beverage cartridge and a beverage brewing apparatus, said single brew beverage cartridge being compostable and biodegradable and comprising a filter, a beverage brewing ingredient, and a lid, said lid comprising a piercable portion, a flange and a collar, said collar comprising a sidewall having a peripheral surface projecting downward from said flange and extending about a longitudinal axis and being resistant to flexure when a force is applied to said lid in a direction parallel to said longitudinal axis, said filter comprising a cup-shaped hollow body holding said beverage brewing ingredient therein, said lid sealing said beverage brewing ingredient in said cup-shaped hollow body, said cup-shaped hollow body being formed of a single layer of paper or paperboard having a slightly tapering cylindrical sidewall and a generally planar bottom wall, said cylindrical sidewall having first and second cylindrical sidewall portions, said first cylindrical sidewall portion being located above said second cylindrical sidewall portion, said second cylindrical sidewall portion having a lower end terminating at said generally planar bottom wall, said second cylindrical sidewall portion and said generally planar bottom wall providing a substantially large surface area through which a brewed beverage can pass, said cylindrical sidewall portion comprising a polymer welding said first cylindrical sidewall portion to said peripheral surface, said beverage brewing apparatus comprising a brewing chamber, a supply of a hot liquid, and a piercing member, said cartridge being configured to be suspended by said flange in said beverage brewing chamber, said piercing member being arranged to apply a force in said longitudinal direction to said piercable portion of said lid to pierce said lid when said cartridge is suspended within said brewing chamber to introduce a hot liquid into said cup-shaped body, said polymer of said first cylindrical sidewall portion forming a barrier deterring the passage of said hot liquid through said first cylindrical sidewall portion and directing the flow of said hot liquid to said second cylindrical sidewall portion to cause said second cylindrical sidewall portion to expand radially outward unconstrained by said brewing chamber to facilitate the mixing of said hot liquid and said beverage brewing ingredient within said cartridge and permit said brewed beverage to exit therefrom.

13. The combination of claim 12 wherein said filter comprises heat sealable filter paper having a filtration layer formed of coarse long fiber pulp and a sealing layer form of a polymer.

14. The combination of claim 13 wherein said lid comprises primarily paper.

15. The combination of claim 14 wherein said primarily paper lid comprises a thin coating of polyethylene.

16. The combination of claim 15 wherein said thin coating of polyethylene is rendered biodegradable through the use of an additive.

17. The combination of claim 14 wherein said filter body is formed of a layer of paper comprising a multitude of paper fibers.

18. The combination of claim 17 comprising a cover disposed over said lid and said filter to prevent the ingress of air and moisture into said beverage brewing ingredient.

19. The combination of claim 18 wherein said cover is removable prior to the suspension of said cartridge in the brewing chamber of the apparatus.

20. The combination of claim 19 wherein said cover comprises a bag.

21. The combination of claim 20 wherein plural of said cartridges are disposed is said bag.

22. The combination of claim 12 wherein said filter body is formed of a layer of paper comprising a multitude of paper fibers.

* * * * *